LADDER BRACKET

Filed Sept. 27, 1965 6 Sheets-Sheet 1

INVENTOR.
Michael J. Okie and
BY Melchior V. Okie
Joseph P. Gastel
ATTORNEY.

LADDER BRACKET

Filed Sept. 27, 1965

INVENTOR.
Michael J. Okie and
Melchior V. Okie
BY Joseph P. Gastel
ATTORNEY.

Aug. 16, 1966 M. J. OKIE ET AL 3,266,593

LADDER BRACKET

Filed Sept. 27, 1965 6 Sheets-Sheet 3

INVENTOR.
Michael J. Okie and
BY Melchior V. Okie

Joseph P. Gastel
ATTORNEY.

INVENTOR.
Michael J. Okie and
BY Melchior V. Okie
Joseph P. Gastel
ATTORNEY.

LADDER BRACKET

INVENTOR.
Michael J. Okie and
BY Melchior V. Okie
Joseph P. Gastel
ATTORNEY.

LADDER BRACKET

INVENTOR.
Michael J. Okie and
BY Melchior V. Okie
Joseph P. Gastel
ATTORNEY.

United States Patent Office 3,266,593

Patented August 16, 1966

3,266,593

LADDER BRACKET

Michael J. Okie, 527 Ave. G, Redondo Beach, Calif., and Melchior V. Okie, 568 Broadway, Lancaster, N.Y.

Filed Sept. 27, 1965, Ser. No. 490,468
24 Claims. (Cl. 182—27)

The present invention relates to an improved ladder bracket of the type utilized to join ladder sections together in various orientations. The present application is a continuation-in-part of application Serial No. 381,012, filed July 8, 1964, now abandoned.

It has been common in the past to utilize fittings, couplings, brackets or the like to join ladder sections together in various orientations. However, prior devices of this type were deficient in a number of respects. More specifically, certain brackets could not provide the necessary rigidity to the joined ladder sections to insure safety. Other brackets did not have versatility in the sense that they were severely limited in the number of configurations of joined ladder sections which they could provide. In addition, certain of the brackets utilized in the past had to be applied to the ladder sections in such a manner that the ladders were weakened by the application of the brackets or fittings because of holes or the like which had to be placed in the ladder sections to accommodate the brackets. It is with a ladder bracket construction that overcomes the foregoing shortcomings of the prior art that the present invention is concerned.

It is accordingly one object of the present invention to provide an improved bracket for joining ladder sections which is universal in the sense that it can be utilized with an equal degree of facility with different types of ladders, such as wooden ladders or aluminum ladders having channel-like side rails and hollow rungs. A related object of the present invention is to provide a single ladder bracket which can be used with a wide range of ladder sizes and shapes.

Another object of the present invention is to provide an improved ladder bracket especially for use with aluminum ladders of the type having side rails with hollow rungs therebetween, the ladder bracket being of a nature so that when it is once locked in position it is virtually impossible to move it therefrom, and when it is in such position it increases the strength of the ladder.

Another object of the persent invention is to provide an improved ladder bracket which can join ladder sections in a plurality of configurations with equal degrees of facility to cause such ladder sections to be formed into items such as extension ladders, scaffolds of an infinite variety of shapes, roof ladders. A-frame ladders, extension scaffolds and the like by merely utilizing ladder sections of the required length and orienting them relative to each other in any desired relationship.

Still another object of the present invention is to provide an improve ladder bracket construction which can be utilized in conjunction with either a conventional wooden ladder or an aluminum type of ladder as described above to provide a device which can be used as a window straddling arrangement to permit a ladder to be located directly in front of a window by virtue of the fact that the straddling arrangement transmits the force of the ladder to areas adjacent the window.

Yet another object of the present invention is to provide a ladder stabilizer which can be mounted at the base of a ladder for stabilizing it against lateral tipping. A related object is to provide such a device which utilizes as a part thereof the improved bracket of the present invention.

Another object of the present invention is to provide an improved ladder bracket which, notwithstanding the manner in which it is attached to an associated ladder section, always provides an extremely rigid connection which is required for the utmost in safety. Other objects and attendant advantages of the present invention will readily be perceived hereafter.

The improved ladder bracket of the present invention consists of two joined bracket sections, each of which comprises an elongated body member which extends parallel to the rungs of a ladder in its mounted condition. Rail bracketing portions for partially encircling the side rails are spacedly mounted on the body member. Each of the rail bracketing portions has sleeve-like means thereon with opposed open ends for receiving the side rails of a ladder. In addition each sleeve has an open side portion on the inner side thereof with such open side portions of the sleeves facing each other, this construction of the sleeve in conjunction with the open ends thereof permitting the sleeve to slide along the rails to any desired location thereon. In addition, the ladder bracket section has locking means operatively associated therewith for locking said bracket section in any desired position on the ladder.

In the preferred embodiment of the present invention the ladder bracket consists of two of the above described bracket sections hinged together in side-by-side relationship to thereby permit each of the bracket sections to pivot relative to each other. It will thus be appreciated that when one of the above described bracket sections is mounted on the rails of one ladder section and the other of the bracket sections is mounted on another ladder section, by virtue of the hinged connected therebetween the ladder sections can be pivoted relative to each other so that they can assume any desired orientation.

As noted above, means are provided for locking each ladder bracket section to the ladder section on which it is mounted. These locking means can lock the bracket section to either wooden ladders, or aluminum ladders having hollow rungs. Firstly, insofar as the aluminum ladders are concerned, the locking means comprises a pin which extends through the hollow rung of a ladder and the end of this pin extends through apertures in the sleeves of the rail bracketing portions. Thus, in this embodiment the bracket section is moved to a position on the ladder rails wherein the apertures in the sleeves are in alignment with the bore of a rung, and the pin is inserted through the aligned apertures and bore to thereby prevent the bracket from sliding further after the pin has been inserted. The same arrangement is utilized with the bracket section which is mounted on another ladder section and is hinged to the above described bracket section. After the bracket has been attached to the ladder sections in the above described manner they may be pivoted relative to each other to assume any desired orientation. After this has been effected, additional locking means are utilized to stabilize the two ladder sections against further pivotal movement. These additional locking means, in this instance are turnbuckles, the opposite ends of which are secured to the adjacent ends of pins and tightened to prevent the pins from moving relative to each other. It will be appreciated that other additional locking means can be utilized. In accordance with another modification of the present invention the ladder bracket may be utilized with wooden ladder sections which do not have the hollow rungs mentioned previously. In use with ladder sections of this type, an arrangement is provided for securely gripping the outer side rails without mutilating them.

The above described bracket construction is universal in its usage in that it can be adjusted to ladders of different widths, that is, ladders having different distances between their side rails. It can also be utilized with ladders having different sizes of side rails and different configurations of side rails, such as channels or I-sections. Furthermore, a pair of hinged bracket sections can be utilized to join ladder sections of different widths to provide a unitary structure of any desired shape.

The improved ladder bracket of the present invention permits ladder sections to be joined to provide any conceivable configuration and therefore is manifestly suitable for use in providing sections such as roof ladders, A-frames, scaffolds of various types, extension ladders, and the like, all with an equal degree of facility and all having the intended reultant strength necessary for safe use.

In addition, one aspect of the present invention is concerned with utilizing the ladder bracket to attach a straddling device to the ladder for the purpose of permitting the ladder to be placed directly opposite a window with the straddling device transferring the weight of the ladder to portions of the building adjacent the window. In addition, the straddling device can be mounted at the base of the ladder to provide lateral extensions to thereby enhance the lateral stability of the ladder against tipping. The various aspects of the present invention will be more fully understood when the following portions of the specification are read in conjunction with the accompanying drawings wherein:

Figures 1, 2:
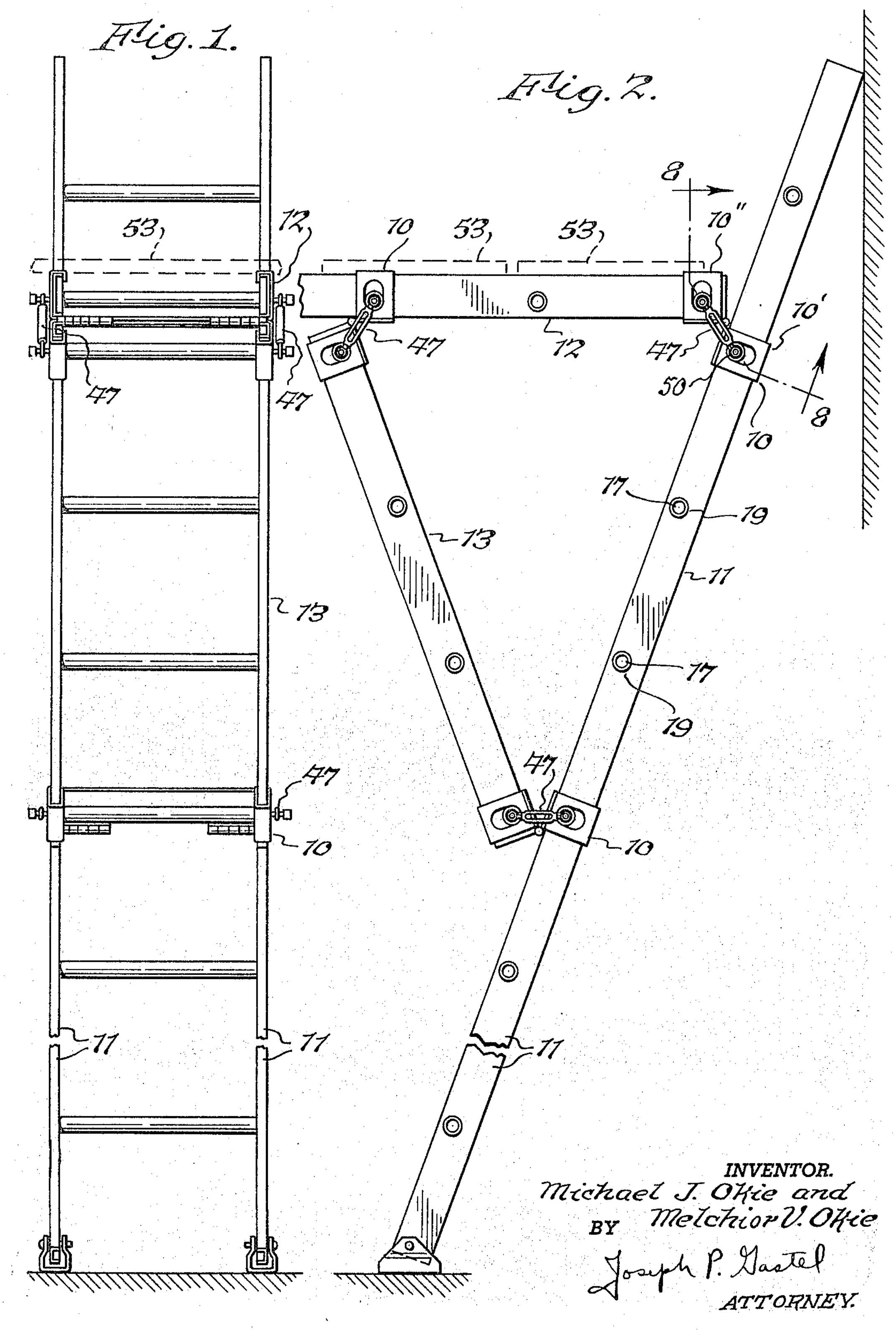
FIGURE 1 is a front elevational view of a plurality of ladder sections joined to each other by the improved bracket of the present invention.
FIGURE 2 is a side elevational view of the construction of FIGURE 1.

In FIGURES 1 and 2 a plurality of ladder sections 11, 12 and 13 are shown joined by the improved brackets 10 of the present invention. It can be seen from FIGURE 8 that ladder sections 11 and 12 are of the type commonly known as aluminum ladders having side rails 14 in the nature of facing channels having webs 15 and flange portions 16. The rungs 17 are hollow tubes which are swaged to provide annular enlargements 18 at their opposite ends which abut the inner faces of webs 15, said rungs also being swaged at 19 after being assembled with the rails to securely lock each of the rungs to the side rails 14. It will be appreciated that the side rails may be channels of different shapes or different geometric cross sections or may be of an I-beam configuration or of a box-type of construction. The particular construction of the side rails is not pertinent to the present invention and therefore for the sake of ease in explanation, unless otherwise noted, it will be assumed that all of the ladder sections, such as 11, 12 and 13, are identical. Therefore, the same numerals will be applied to corresponding parts of the various ladder sections.

Figures 5, 6, 7:
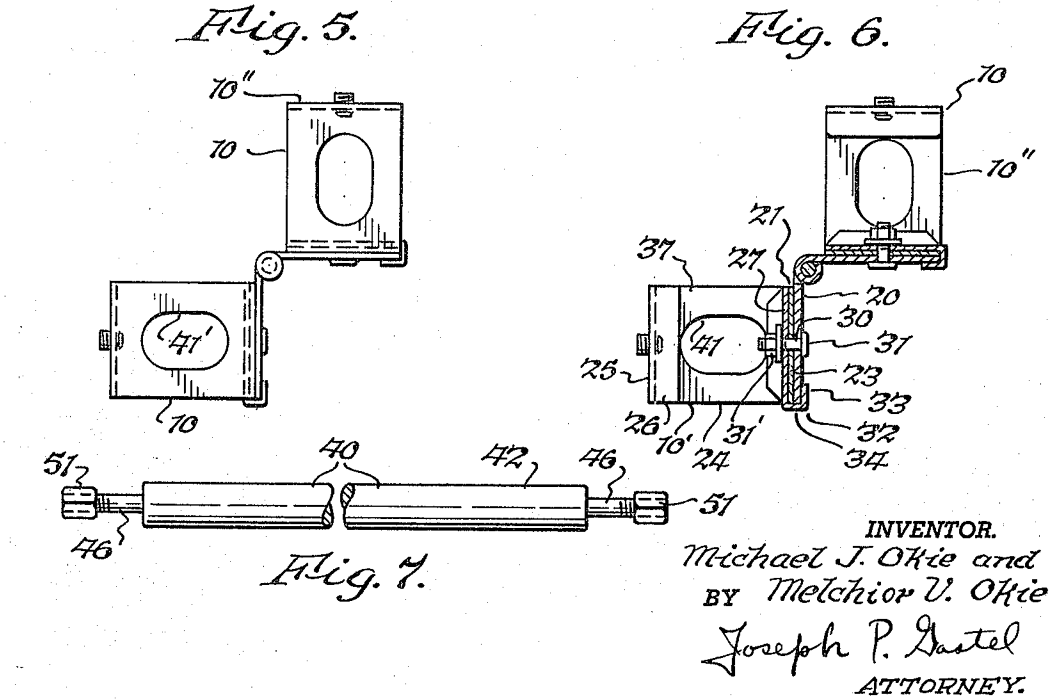
FIGURE 5 is a view taken substantially along line 5—5 of FIGURE 3 and showing the apertures in the sleeves for accommodating rungs located in different positions on different types of ladders.
FIGURE 6 is a view, partially in cross section taken substantially along line 6—6 of FIGURE 3 and showing further details of the adjusting construction.
FIGURE 7 is a side elevational view of a locking pin utilized in conjunction with the bracket of the preceding figures.

Each of the ladder brackets 10 consists of two sections 10′ and 10″ which are hinged to each other by hinges 44, the sections being mirror images of each other, except as noted hereafter. However, it will be appreciated that they may also be identical. Bracket section 10′ includes a central body member 20 which is in the nature of an elongated rectangular plate, but as will become more apparent hereafter it can take any desired form such as a rod or bar or the like, since its function is to mount rail bracketing portions 21 and 22 at its opposite ends. Rail bracketing portion 21 (FIGS. 3, 4 and 6) includes a base plate 23 which is approximately the same width as plate 20. An end plate 24 is formed integrally with plate 23 and extends substantially perpendicularly thereto. An edge plate 25 is formed integrally with plate 24 and extends substantially perpendicularly thereto. A flange portion 26 extends perpendicularly from edge portion 25. Essentially portions 23, 24, 25 and 26 define a J-section or may be considered to be a modified form of channel having an elongated leg in the form of plate 23. Mounted on plate 23 is a hold-down plate 27 having an elongated slot 28 which overlies elongated slot 29 in plate 23 which in turn overlies aperture 30 (FIG. 6) in elongated plate 20. Aperture 30 is slightly larger than bolt 31 which extends through aligned apertures 28, 29 and 30, to secure plates 27 and 23 in any desired adjusted position on plate 20. In this respect, it can be seen that because of the elongated nature of aligned slots 28 and 29, when nut 31′ is loosened, plate 23 may be moved back and forth longitudinally of plate 20 to thereby adjust its position thereon and thereby effectively adjust the spacing between rail bracketing portion 21 and rail bracketing portion 22 mounted on the opposite end of plate 20 to accommodate ladders having different spacing between their side rails. The tightening of nut 31 in the adjusted position of bracketing portion 21 will hold it firmly in position.

To insure rectilinear movement of plates 23 and 27, plate 27 has its edge portion formed into a hook 32 (FIG.

6). The edge of plate 20 lies between portion 33 of hook 32 and plate 23. In other words, the lateral edge 34 of hook portion 32 by abutting the edges (not numbered) of plates 20 and 23 prevents the latter from moving out of axial alignment with plate 20 when bolt 31 is in position. If desired, a flange (not shown) may be located on the opposite edge of plate 27 from hook 32 to bend downwardly and abut the adjacent edge of plate 23 to thereby further stabilize the assembly. In lieu of hook 32 for providing rectilinear movement of plates 27 and 23, a pin connection may be provided wherein pins and slots may be utilized to mount plates 20, 23 and 27 together to provide the desired rectilinear motion.

The rail bracketing portion 21 may be adjusted to accommodate different sizes of ladder rails. In this respect, ladder rail 14 is received within rail bracketing portion 21 and more specifically within the sleeve-like portion 35 thereof formed by plates 24 and 25, flanges 26 and 36 and a portion of plate 23 lying between plate 24 and flange 36 formed at the end of plate 27. More specifically, if the ladder rail 14 is much smaller than the distance between plates 25 and 23, set screw 36 is turned into edge 25 to take up the slack. While not shown, if desired, a filler plate, which may essentially be of rectangular configuration, can fit into abutting relationship with the inner surface 25' of plate 25 between plate 24 and flange 26 to take up such slack. Furthermore, if flange 16 of rail 14 is much smaller than the distance between flange 26 and plate 24, plate 27 is moved to the left in FIGURE 4 so that flange 36 at the end thereof takes up the slack. It will be appreciated of course that the outer peripheral configuration of rail bracketing portion 21 must be larger than any ladder rail on which it is to be mounted. However, the sleeve portion 35 thereof can be adjusted to take up any excessive slack at noted above. In the drawings, the necessary clearance between the side rail 14 and sleeve 35 is not shown, but it will be understood that such clearance is necessary for proper operation. It is to be noted at this time that set screw 36 in addition to being used to take up excessive slack may also be used to lock bracketing portion 21 to rail 14 under certain circumstances, if desired.

At this point it is to be noted that rail bracketing portion 22 is a mirror image of rail bracketing portion 21 and it is therefore deemed that a detailed description thereof is unnecessary. It will be appreciated of course that rail bracketing portion 22 contains all the necessary structure for effecting movement thereof toward and away from rail bracketing portion 21 to thereby adjust the distance therebetween, and, in addition, contains structure for adjusting the size of portion 22 to take up the slack when the bracket section 10' is used with relatively small ladder rails.

Figure 8:
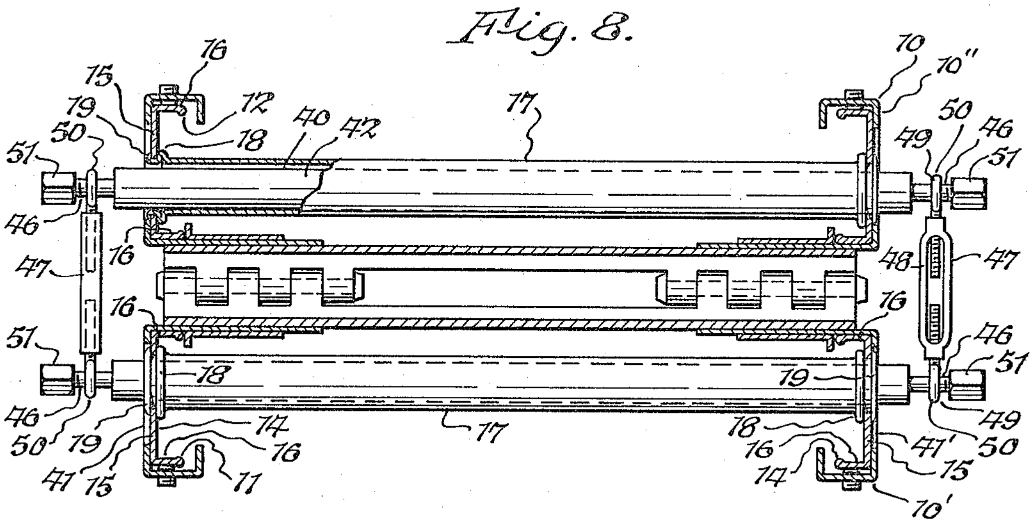
FIGURE 8 is a view taken substantially along line 8—8 of FIGURE 2 and showing a bracket in fully assembled and locked relationship on adjacent ladder sections.
Figure 22:
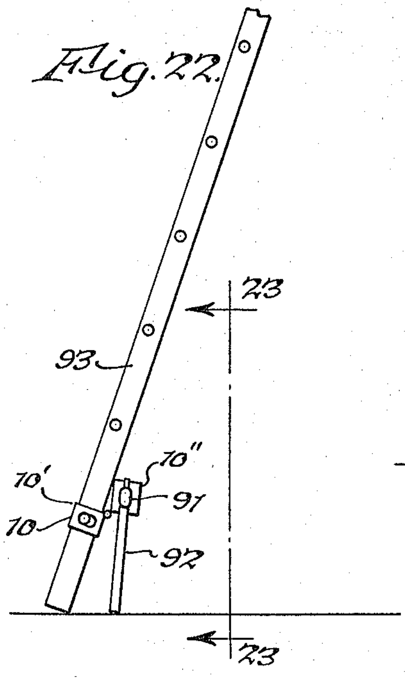
FIGURE 22 is a view showing how the window straddling attachment may be utilized as a stabilizer to prevent lateral tipping of a ladder.

Bracket section 10', because of the construction described in detail above, can be slid over the opposed side rails of a ladder. More particularly, after sleeve-like portions 35 and 35' have been adjusted to proper size, they are slid over the side rails and are moved to any desired position. It will be noted that the rungs 17 will not interfere with such movement because there is a space 37 between plate 23 and flange 26 for permitting passage of the rungs 17 during sliding of section 10'. It is to be noted from FIGURE 4 that plate 24 lies on the outside of the side rail, edge plate 25 and its opposed portion of plate 23 are adjacent the edges of the side rail, and flanges 26 and 36 are in substantial abutting engagement with the inner edges of the side rail to thereby substantially enclose the side rail within sleeve-like portion 35 while permitting sufficient clearance for movement of the rail bracketing portion 21 past the rungs 17. It is to be noted that it is preferable for side plates 24 to be modified, as shown in FIGURE 22, to include ridges 38 and 39 which are located in parallel spaced apart relationship so that they fall on opposite sides of swaging 19 (FIG. 8). This facilitates the sliding action of rail bracketing portions 21 and 22 by preventing the edges of plates, such as side plates 24, from becoming hung up on the swaging 19 which extends outwardly of the side rails.

Bracket section 10' includes associated structure for locking it securely in position at any desired location on ladder section 11. More specifically, after it has been slid to a location in alignment with a hollow rung 17, a pin 40 (FIG. 7) is slid through elongated opening 41 in plate 24 and into hollow rung 17 and thereafter through elongated opening 41' (FIG. 4) which is in alignment with and the same size as elongated opening 41. The narrow dimension or minor axis of aperture 41 is slightly larger than the diameter of central portion 42 of pin 40. It is the ends of these central portions which extend through aligned apertures 41 and 41'. It will readily be seen that when pin 40 is inserted in the foregoing manner, bracket section 10' cannot possibly move from its pinned position. Central portion 42 may have a wood core and a metal sheath. It will become more apparent hereafter, that while pinning bracket section 20 to the ladder section 11 provides a good rigid form of attachment, there are ways of providing a rigid connection without having alignment between apertures 41, 41' and the bore of the rung 17.

At this point it is to be noted that apertures 41 and 41' are elongated. This is necessary to accommodate the offset in the mounting of the rungs 17. See FIGURES 2 and 8. More specifically, a bracket section, such as 10', may either be mounted in the position shown in FIGURE 2 or it may be mounted in an inverted position, in which event the rung 17 would be in alignment with the opposite end of the slot than with which it is in alignment in FIGURE 2. Stated otherwise, if rungs 17 were centrally located in the side rails, elongated apertures, such as 41 and 41', would not be required. In addition, the elongated slots 41 and 41' will accommodate rungs spaced different distances from the edge of the rails, in various ladder constructions.

The foregoing description has been directed to a bracket section such as 10' consisting of a central plate and rail bracketing portions mounted on opposite ends thereof. It will be appreciated that the foregoing type of bracket section may have any type of carrying device attached thereto for supporting a foreign object from a ladder. However, when a bracket section 10' is used in conjunction with another bracket section 10'', as will be described hereafter, the other device attached to the first ladder section will generally be another ladder section as depicted in FIGURES 1 and 2. More specifically, as noted above, bracket section 10'' (FIGS. 3 and 4) is a mirror image of section 10'. Plate 20' is a mirror image of plate 20. Rail bracketing portion 21' including all components thereof, is a mirror image of rail bracketing portion 21. Rail bracketing portion 22' in all respects is a mirror image of rail bracketing portion 22. Plates 20 and 20' are secured to each other at edges 43 and 43', respectively, by hinges 44. As shown in the figures, the hinges consist of staggered fingers (not numbered) formed integrally with plates 20 and 20' and held together by pins 45. It will be appreciated that, if desired, the hinges need not be formed integrally with plates 20 and 20' but may be conventional hinges suitably secured to said plate by screws, riveting or the like. Rail engaging portions 22, 21' and 22' all contain the same structure as described in detail above relative to rail engaging portions 21 and therefore an additional description of this structure is deemed unnecessary. At this point it is to be noted that bracketing portions 21 and 22 may be spaced and adjusted in size to accommodate a first ladder section and bracketing portions 21' and 22' may be spaced and adjusted in size to accommodate a second ladder section which is different in size from the first ladder section. Thus two different sizes of ladder sections may be joined to each other.

It will readily be appreciated that after the side rails of a ladder section are inserted between the rail engaging portions 21′ and 22′, bracket section 10″ can be moved to any desired position on a ladder section such as 12 (FIG. 2). Thereafter, a pin, such as 40, can be inserted between the aligned apertures in the rail bracketing portions and the rung to firmly lock bracket section 10″ to the ladder section after the other bracket section 10′ has been locked to the other ladder section. By virtue of the fact that the bracket sections, such as 10′ and 10″, are hinged to each other in the above described manner, the ladder sections, such as 11 and 12, may be pivoted relative to each other about the hinge pins to cause them to assume any desired orientation.

It can thus be seen how ladder sections 11 and 12 are joined by one bracket 10 consisting of bracket sections 10′ and 10″. The same procedure is followed in fastening ladder sections 12 and 13 (FIG. 2) and for also fastening ladder sections 11 and 13 (FIG. 2). It will be appreciated that the above described connections, without more, will generally not provide the desired rigidity to the construction. Therefore, a locking arrangement is provided for securely locking the joints against movement and for preventing pins 40 from working out of position. In this respect, as can be seen from FIGURES 7 and 8, reduced end portions 46 extend from central portion 42 of pin 40. Turnbuckles 47 (FIG. 8) have a central body portion 48 which receives screws 49 having eyes 50 at the outer ends thereof which are inserted over reduced ends 46 of pins 40. Thereafter, nuts 51 are utilized to prevent eyes 50 from moving off of ends 46. The central body portion 47 of each turnbuckle is tightened to move pins 40 as close to each other as the construction will permit and this will tighten the joint produced by each bracket 10 against movement. After the turnbuckles 47 have been mounted on the opposite ends of each pair of pins, as shown in FIGURE 8, a construction, such as shown in FIGURE 2, is extremely rigid, and, as depicted in FIGURE 2, planks such as 53 may be laid across ladder section 12 and an adjacent spaced ladder section 12 (not shown) to provide an extremely stable scaffold construction.

In the construction shown in FIGURES 1 and 2 a safety rail may be very easily mounted on ladder section 12, the safety rail consisting of a ladder section extending vertically upward from ladder section 12 to the left of the ladder bracket 10. This ladder section would be joined to section 12 by bracket 10 in a manner described above relative to the remainder of the joined ladder sections, and the space between a vertical section extending upwardly from ladder section 12 and a spaced analogous section extending upwardly from another ladder section (not shown) which is similar to section 12 and supports the opposite ends of planks 53 could be bridged by ropes or elongated rods or the like to thereby enhance the safety of the users of the scaffold by providing them with a guide rail.

Figure 19:
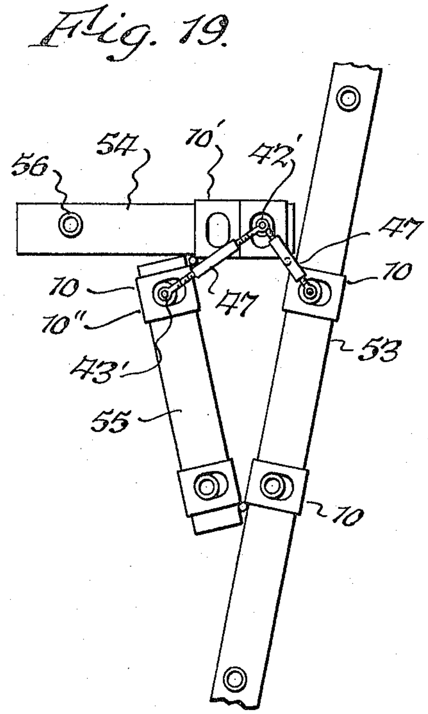
FIGURE 19 is a view showing an alternate way in which the ladder brackets can be joined to ladder sections to provide increased versatility to the bracket construction.

Reference is now made to FIGURE 19 which shows an alternate way of securing ladder sections to each other. As noted above in FIGURES 1 and 2, the brackets 10 which join the ladder sections all include pins 40 which extend through both the various hollow rungs and the bracket sections. It will be appreciated that there are certain times that it is not feasible to use this construction because being limited to passing pins through the bracketing portions would not provide the desired configuration. In other words, assume that the main ladder section 53 extends against a wall at a certain angle. This being the case, the spacing of the adjacent rungs in all the ladder sections 53, 54 and 55 would determine the inclination of the ladder section 54 which would support planks if pins 40 had to pass through each bracket 10. To overcome the foregoing shortcoming, the structure of FIGURE 19 is used. More specifically, in FIGURE 19 a ladder section 53 is shown which mounts ladder sections 54 and 55. Section 54 is intended to be horizontal and support a plank of a scaffold and section 55 acts as the brace therefor. It will readily be appreciated that with the specific inclination of section 53, if support section 55 had to have section 10′ of its upper bracket 10 in alignment with rung 56, section 54 would not be horizontal. Therefore, in this particular case, section 10′ of bracket 10 has been moved to the position shown and section 55 is locked against pivotal movement in a counterclockwise direction about its lowest portion by one of the turnbuckles 47 having its opposite ends mounted on one pin 42′ and the other end on pin 43′. It is to be especially noted that pins 42′ and 43′ (which are identical to pin 40) do not extend through bracket sections which are hinged to each other but bracket sections which are independent of each other. It will readily be appreciated that by loosening turnbuckles 47, bracket 10 which is mounted on sections 54 and 55 can be moved to the left with bracket section 10′ sliding to the left on the side rails of the ladder section. While turnbuckle 47 has been shown as extending between pins 42′ and 43′, it will be appreciated that it could also extend between pin 43′ and the upper pin extending through the side rails of ladder sections 53. In other words, this construction is intended to show that the use of the turnbuckles is not limited to tying together pins which extend through adjacent hinged bracket sections, but may be used to fasten pins of bracket sections which are not hinged to each other. In addition, it is to be especially noted that one end of the turnbuckle or fastening means may be mounted on a pin which extends through a bore of a rung which is aligned with the apertures in the bracket section and the other end of the turnbuckle may be fastened to the end of a pin which merely extends through a rung but not through the apertures in a bracket section. In other words, there are an infinite number of ways in which the ladder sections can be joined considering that the turnbuckles can join pins extending through bracket sections or join a pair of pins extending through a bracket section to a pin merely extending through a rung.

Considering how the ladder sections can be put together, as shown in FIGURES 2 and 19, an infinite number of combinations can be made by joining ladder sections to each other by means of the improved ladder bracket 10 of the present invention, and all of these combinations will provide an extremely high degree of rigidity to thereby enhance ladder safety. Some of these configurations are shown in FIGURES 14 through 18 and will be briefly described hereafter.

Figures 14, 15, 16:
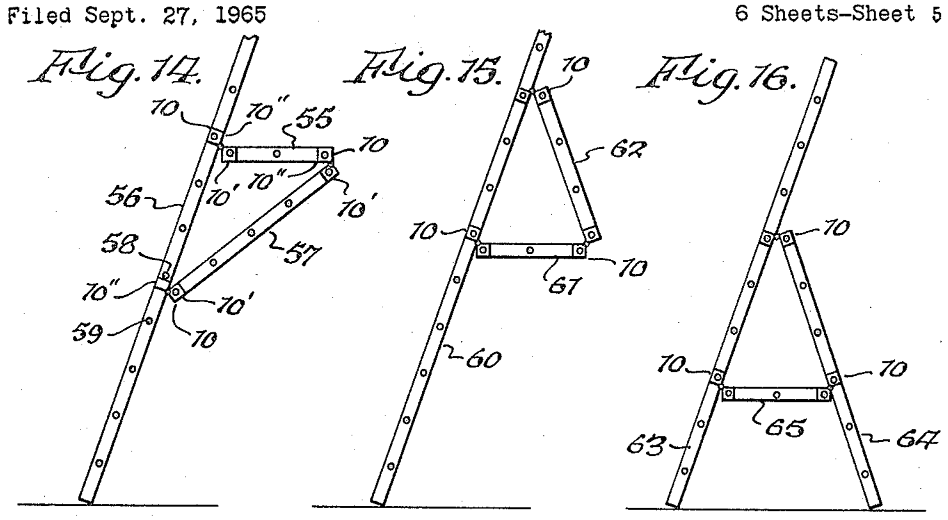
FIGURE 14 is a side elevational view showing one form of scaffold which may be used by combining the ladder sections in a particular orientation.
FIGURE 15 is a side elevational view showing another type of scaffold which may be formed from ladder sections with the proper use of the ladder brackets.
FIGURE 16 is a side elevational view of an A-frame type of ladder which may also mount scaffolding, the sections being joined by the improved brackets.

In FIGURE 14, three ladder sections are shown joined to each other for the purpose of supporting one end of planking of a scaffold. Another section joined together, such as shown in FIGURE 14, is spaced therefrom and the planking is supported on top of ladder section 55 and its spaced counterpart. In the configuration of FIGURE 14 ladder section 55 is secured to ladder section 56 by means of brackets 10 having hinged sections 10′ and 10″. At this connection turnbuckles join the ends of the pins (not shown), each of which extends through the hollow rung and the apertures in the end of the rail bracketing portions. The same relationship exists between ladder section 55 and supporting ladder section 57 which are joined by bracket 10. It is to be noted that bracket sections 10′ and 10″ are so located that their rail bracketing portions are in alignment with the bores of the rungs so that the pins can extend therethrough. While not shown, turnbuckles such as described above, are used at this joint also. However, because of the spacing between the rungs of the ladder sections and because of the inclination of ladder section 56, in order to obtain a horizontal attitude of ladder section 55, the lower bracket section 10″ on ladder section 56 will fall below hollow rung 58. This being the case, the modified connection described in detail above relative to rung 19 is used. More specifically, the sleeve-like portions such as 35 at the end of bracket section 10′ on ladder section 57 are placed in alignment with the bore of the lowest rung, as shown, and a pin, such as 40, is inserted therethrough. Thereafter a pin is inserted through the bore in rung 58. Thereafter turnbuckles 47 (not shown) are mounted between the ends of the adjacent pins in sections 56 and 57 so that while the ends of bracket section 10′ are not in alignment with rung 58, the support for the lower section of ladder section 57 is obtained from the pin extending through rung 58. It will be appreciated that if the geometry was such that rung 58 was below the side of bracket section 10″, the turnbuckle could also have been used or if desired the rail bracketing portion or sleeve-like portions could have merely rested on the ends of the pin.

In constructions wherein there is not exact alignment between the rail bracketing portion such as 10′ and the rung, two turnbuckles may be used to thereby provide a rigid triangular construction, if this amount of rigidity is required for any particular application. More specifically, for example, one turnbuckle could extend between the pin in rung 58 and the pin extending through the lower bracket section 10′ on ladder section 57. In addition, an addition turnbuckle could extend between a pin extending through rung 59 and the pin extending from said bracket section 10′. This would provide an extremely rigid construction. While the fastenings or pin constructions have been described only on one side of the ladder sections, it will be appreciated that the connections are the same on the opposite side relative to the other side rails.

In FIGURE 15 another orientation of ladder sections 60, 61 and 62 is shown wherein section 60 is leaning against a wall and sections 61 and 62 are fastened to it and to each other by brackets 10. As noted above, the ends of the pins extending from brackets may be joined by turnbuckles. Section 61 is horizontal for the purpose of supporting an end of a plank thereon, the other end of said plank being supported by a like orientation of ladder sections.

FIGURE 16 shows another ladder configuration consisting of sections 63, 64 and 65 which are joined to each other by brackets 10, as shown. This configuration is essentially an A-frame type of ladder having an extended upper portion formed as a part of section 63. Section 65 may be utilized to support a plank of a scaffold.

Figure 17:
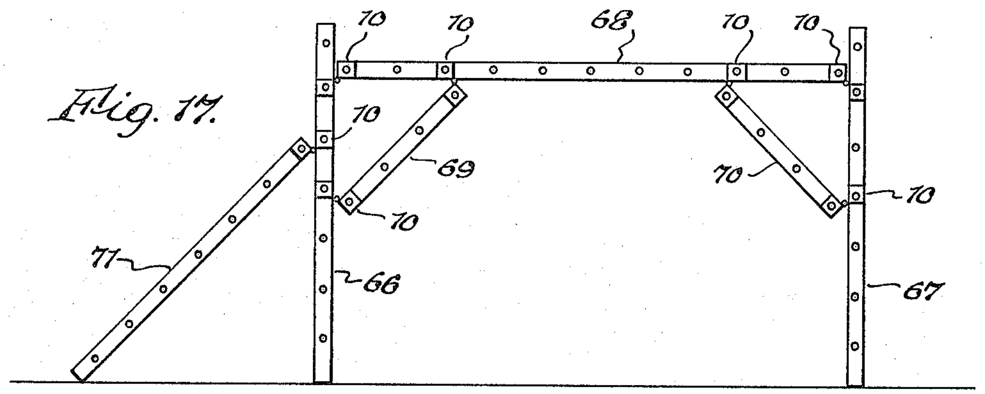
FIGURE 17 is another type of scaffolding which may be fabricated by combining ladder sections.

FIGURE 17 discloses an additional orientation of ladder sections wherein vertical ladder sections 66 and 67 are provided with horizontal section 68 being joined thereto by brackets 10 which function in the above described manner. In addition, to provide rigidity to the foregoing construction, brace sections 69 and 70 are provided. Section 69 extends between section 66 and 68 and is joined thereto by brackets 10. Section 70 extends between section 67 and 68 and is joined thereto by brackets 10. It will be appreciated that turnbuckles and pins used in the manner described above. In order to reach the top ladder section 69 which serves as a support for workmen when planks are laid thereacross, a ladder section 71 is provided to act as a stairway, and the upper portion of this section is attached to section 56 by means of a bracket 10 which is secured to these sections in the above described conventional manner. If it is desired to raise the height of the top portion of the scaffold, it is merely necessary to swing section 71 into alignment and abutting relationship with section 66 and do the same to another section, such as 71, which is attached to section 67. These sections can be fastened to each other against spreading apart in a manner which will be described hereafter relative to FIGURES 11 through 13 and it will be seen that after this is done, the elevation of section 68 will be increased because the bottom of the scaffold will then be the bottom of section 71 and not the bottom of sections 66 and 67, as shown.

Figure 18:
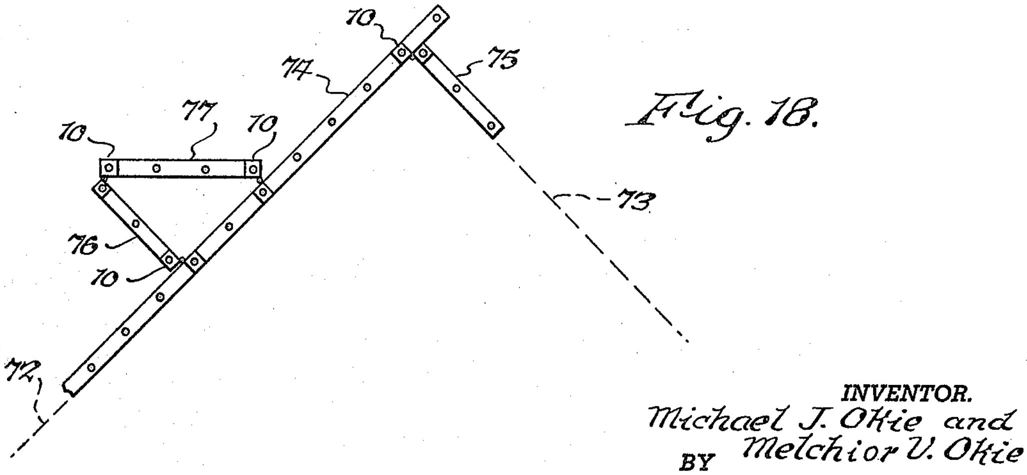
FIGURE 18 shows ladder sections oriented relative to each other by the brackets to provide a combined roof ladder and scaffold construction.

In FIGURE 18 a combined roof ladder and scaffold construction is shown. The roof line is indicated by dotted lines 72 and 73. Ladder section 74 has ladder section 75 secured thereto by means of bracket 10 which functions in the above described manner. Turnbuckles are used to secure the pins which extend through the aligned rungs and rail bracketing portions. This will cause portion 75 to act as a hook to hold section 74 in position on the roof. Portions 74 and 75 follow the profile of the roof apex as indicated by the intersection of dotted lines 72 and 73. It will be appreciated that if desired two ladders of extremely long length, such as 74, may be used and pinned together as shown in FIGURE 18 whereupon the locking turnbuckles, such as 47, need not be used because one ladder section would balance the other. It is to be also noted that sections 74 and 75 can be adjusted to any desired angularity and to fit any particular roof apex and that the turnbuckles are thereafter tightened to cause the ladder sections to retain this position. Secured to ladder section 74 are ladder sections 73 and 77 by means of ladder brackets 10 in the manner described in detail above. Sections 76 and 77 are secured to each other by ladder bracket 10. As shown, ladder section 77 is horizontal and may serve as a support for the end of a plank or the like, the other end of the plank being supported by an analogous section similar to 77 but spaced therefrom on another ladder section which is similar to 74. In other words, in any of the above described configurations, except that of FIG. 17, wherever the horizontal section of a ladder is used to support a portion of a scaffold, the ladder construction will have to be used in pairs.

Figures 11, 12, 13:
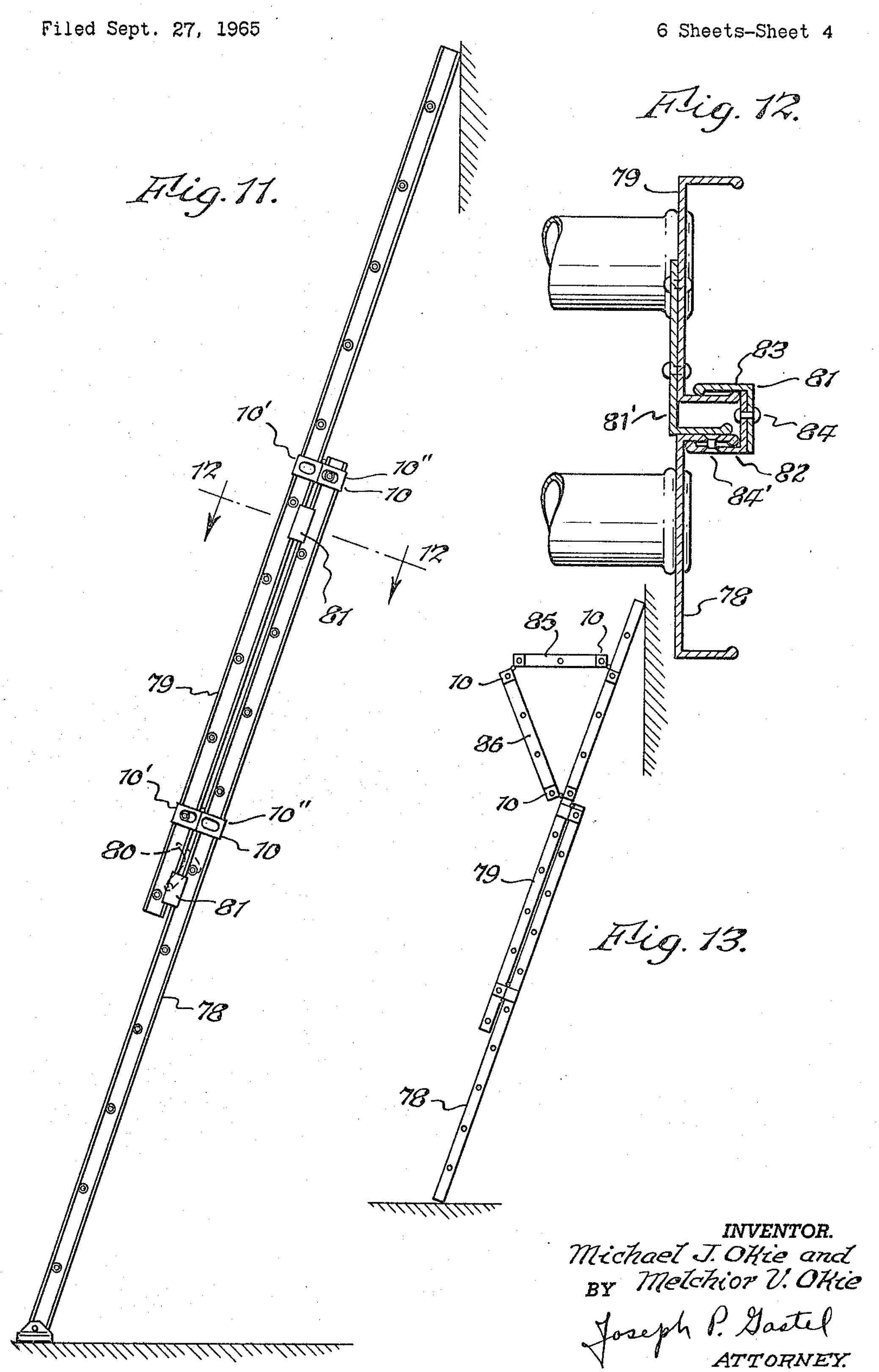
FIGURE 11 is a view showing how the improved bracket may be used in pairs to provide an extension ladder.
FIGURE 12 is a view taken substantially along line 12—12 of FIGURE 11.
FIGURE 13 is a view showing how ladder sections may be combined to provide an extension scaffold.

In FIGURES 11, 12 and 13 the improved brackets 10 are used to provide an extension ladder. In this respect reference is now made to FIGURES 3 and 4 from which it can be seen that plate 20 has an aperture 29′ therein and plate 20′ has an aperture 30′ therein. When sections 10′ and 10″ are pivoted relative to each other so that plates 20 and 20′ are parallel, apertures 29′ and 30′ will be in alignment. A bolt or other suitable fastening means may be inserted through aligned apertures 29′ and 30′ to thereby cause these plates to be locked in their parallel positions. It is when they are thus locked that they may be used as parts of an extension ladder as shown in FIGURE 11. More specifically, the upper bracket 10 has portion 10″ thereof in alignment with a rung of the lower ladder section 78 and a pin, such as 40 (not shown), extends therethrough and is suitably retained in position against slipping out. This may be done by suitable caps or the like mounted on the ends of pin 40. The lower ladder bracket 10 has section 10′ thereof in alignment with one of the rungs of ladder section 79. A pin such as 40 (not shown) extends through the rung and the apertures in the rail bracketing portions of section 10′. Suitable means such as caps are mounted on the ends of pin 40 to retain it in position. It can thus be seen that one ladder bracket 10 is pinned to one ladder section and the other ladder bracket 10 is pinned to the other ladder section. Thus, ladder sections 78 and 79 can be slid relative to each other and brackets 10 hold them firmly against separating. In other words, there is a good solid sliding connection between the ladders. The sections 79 and 78 are held in their adjusted positions by a conventional locking latch 80 which is schematically shown. It will be appreciated of course that locking of the sections together may be further improved, if desired, by aligning each of the sections 10′ and 10″ of each of the brackets 10 with a rung in each of the ladder sections and using pins to prevent relative sliding movement of the ladder sections relative to each other. It will also be appreciated that brackets 10 may be removed from ladder sections 78 and 79 and may be used with other ladder sections to provide any configuration shown in FIGURES 14 through 18, or any others within the imagination of the user. If desired, further stabilizing channels 81 may be utilized in addition to ladder brackets 10. This is shown in cross section in FIGURE 12. More specifically, channel 81 consists of angle portions 82 and 83 which are secured to each other by spaced rivets 84. The opposed legs of angles 82 and 83 bracket the adjacent flanges of the side rails of sections 78 and 79. A rivet 84′ may extend through one of the legs 82 and one of the side rail flanges to secure channel 81 in positions relative to one of the ladder sections while permitting the other one to slide relative thereto. The other channel 81 has its legs attached to the other ladder section. A short angle section 81′ is riveted to side rail 79 as shown to provide the desired spacing between the adjacent flanges of the side rails 79 and 78.

In FIGURE 13 an extension scaffold is shown which is fabricated from the sections, such as 78 and 79 described in FIGURES 11 and 12. The subject matter of FIGURE 13 differs, however, in that on ladder section 79 are mounted ladder sections 85 and 86 each of which are secured thereto by ladder brackets 10. Sections 85 and 86 are also secured to each other by ladder bracket 10. As can be seen, each of the ladder rail bracketing portions of each of the brackets 10 are in alignment with the rungs of the sections on which they are mounted and therefore suitable pins, such as 40 (not shown), can be placed in aligned apertures in the brackets and the rungs to retain the configuration shown. It will be appreciated that locking turnbuckles are also used to further stabilize the assembly by extending between adjacent pairs of pins. Planking is intended to be laid across ladder section 85 to provide the scaffold walk. When extension ladders, such as shown in FIGURE 13, are used to provide an extension scaffold, it will be appreciated that two spaced ladder sections are utilized and the planking rests on ladder section 85 and its spaced counterpart mounted on another ladder. To raise or lower the extension scaffold, it is merely necessary to simultaneously raise or lower section 79 and its counterpart on the other ladder section.

Figures 20, 21:
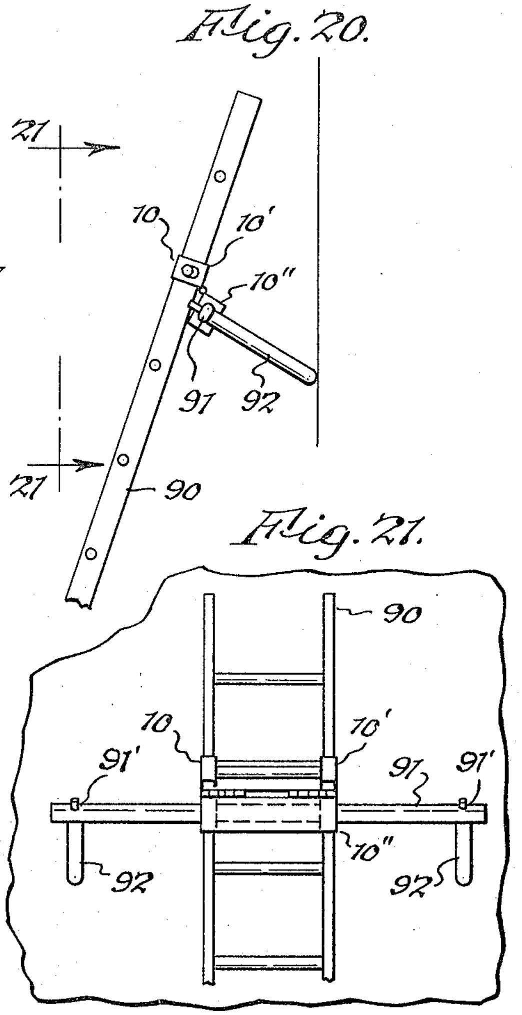
FIGURE 20 is a view showing a window straddling attachment which may be used with the improved bracket.
FIGURE 21 is a view taken substantially along line 21—21 of FIGURE 20.

In FIGURES 20 and 21 another modification of the present invention is shown which depicts a window straddling device which can be made with the improved bracket 10 of the present invention. More specifically, ladder section 90 has bracket section 10′ of bracket 10 mounted thereon in the above described manner with the apertures in the rail bracketing portion in alignment with a hollow rung and a pin inserted therethrough. Bracket section 10″ hangs downwardly and an elongated member 91 having a pair of spaced legs 92 extends through the aligned elongated apertures such as 41 and 41′ shown in FIG. 4. It can be seen that elongated member 91 is of substantially the same cross section as the shape of the elongated apertures 41 and 41′ (FIG. 4) in the rail bracketing portions of section 10″. Therefore, there can be no relative turning movement therebetween. The legs 92 are adapted to engage the portions of a wall on opposite sides of a window to thereby hold the upper section of a ladder away from the window and thereby permit the placement of ladder section 90 in direct opposition to a window.

Figure 23:
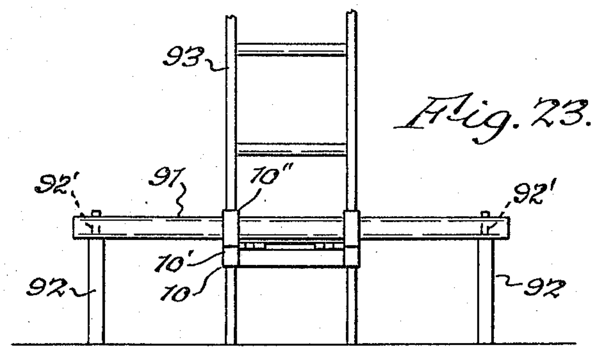
FIGURE 23 is a view taken substantially along line 23—23.

In FIGURES 22 and 23 a still further use of the improved bracket 10 of the present invention is shown. In this use, a stabilizer construction is provided for the base of the ladder for stabilizing it against tipping laterally. More specifically, bracket section 10′ is mounted on ladder section 93 with the opposite portions thereof in alignment with the lowest rung of the ladder and a pin (such as 40) extending therethrough. An elongated member 91, which is the same length used in the embodiment of FIGURES 20 and 21, extends through the aligned apertures of the rail bracketing portions of bracket section 10″. Legs 92 rest on the ground at spaced locations which are a further distance apart than the side rails of ladder section 93 to thereby provide increased stability. It will be noted again that elongated member 91 cannot rotate in the aligned apertures of section 10″ because of the noncircular shape of both. Elongated bar 91 may be used for both the construction of FIGS. 20 and 22. To this end two pairs of holes 91′ and 92′ are provided with one of each pair being at opposite ends of bar 91. One pair 92′ has its axes along the major axis of the cross section of bar 91 and the other pair 91′ along the minor axis. Compare FIGURES 20 and 22.

Figure 9:
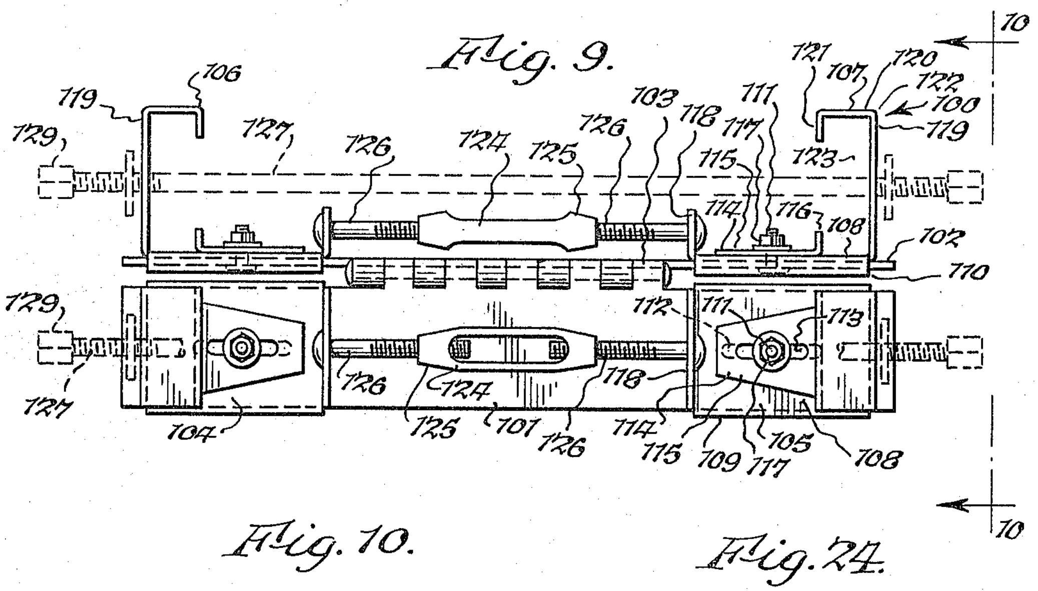
FIGURE 9 is a front elevational view of a modified type of bracket and one which is intended to be used with aluminum ladder sections having hollow rungs or with conventional wooden ladders.
Figure 10:
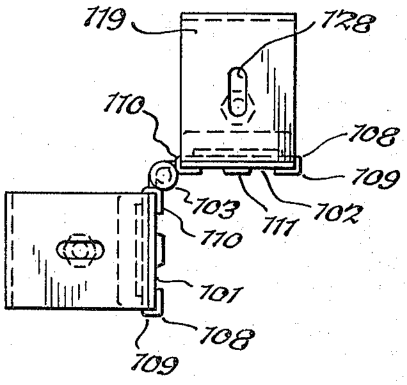
FIGURE 10 is a view taken substantially along line 10—10 of FIGURE 9.
Figure 24:
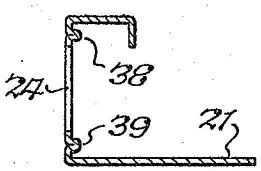
FIGURE 24 is a view showing a preferred construction of the side of the rail bracketing portion for preventing binding.

In FIGURES 9 and 10 an alternate ladder bracket construction is shown. This construction may be utilized with equal facility on ladders of the conventional wooden type or aluminum ladders having hollow rungs of the type described above. The overall construction of this embodiment is generally the same as that described above relative to FIGURES 1 through 8. More specifically, ladder bracket 100 includes a pair of elongated plate members 101 and 102 which are fastened to each other by hinge 103. Plate 101 has rail bracketing portions 104 and 105 mounted at opposite ends thereof. Plate 102 has rail bracketing portions 106 and 107 mounted at the ends thereof. All of these rail bracketing portions are identical to each other and since plates 101 and 102 are shown in FIGURES 10 and 11 as extending substantially perpendicularly to each other, for ease of description, portions 105 and 107 will be described simultaneously and the same numerals will denote identical elements of structure. Each of the rail bracketing portions 105 and 107 includes a base plate 108 of substantially the same width as plate 101 and having their sides hooked around base plates 101 and 102 as shown at 109 and 110 in FIGURE 10. This construction permits plates 108 to slide back and forth on plates 101 and 102. A bolt 111 extends through an aperture, not numbered, in plates 101 and 102, through an elongated slot 112 in plate 108 and thence through an elongated slot 113 in the trapezoidal base portion 114 of plate 115 having flange 116 at the end thereof. When nut 117 is tightened, plates 101, 108 and 115 will be locked together for purposes which will become more apparent hereafter. Plate 108 has a flange 118 extending perpendicularly therefrom at one end thereof and a face 119 extending perpendicularly therefrom at the other end thereof. An end plate 120 extends perpendicularly to plate 119 and a flange 121 is turned inwardly and extends perpendicularly to end plate 120. As noted above, rail bracketing portions 104, 105, 106 and 107 are all identical in construction.

In operation, parts 116, 119, 120 and 121, and the portion of bottom plate 108 between portion 116 and 119 essentially constitutes a sleeve-like member 122 with open ends and an opening 123 between flanges 116 and 121. It will readily be visualized that sleeve-like member 122 may be slipped over a side rail of a ladder and may be slid therealong by virture of the fact that opening 123 will permit the rungs to move through the sleeve-like member. In order to adjust the rail engaging portions to fit any particular size of ladder, bolts 111 are loosened and central portion 124 of turnbuckle 125 is turned to cause screws 126 to move into or out of the portion 124. This will cause, as for example, rail bracketing portions 106 and 107 to either approach or recede from each other to thereby accommodate their spacing for any particular width of ladder. In addition, after proper spacing between plates 119 has been obtained, plates 114 are moved until the distance between flange 116 and plate 119 is approximately the thickness of the ladder side rail. Thereafter, nuts 117 are tightened to lock the rail engaging portions in position which accommodates the size of the particular side rails and the spacing therebetween.

Figures 3, 4:
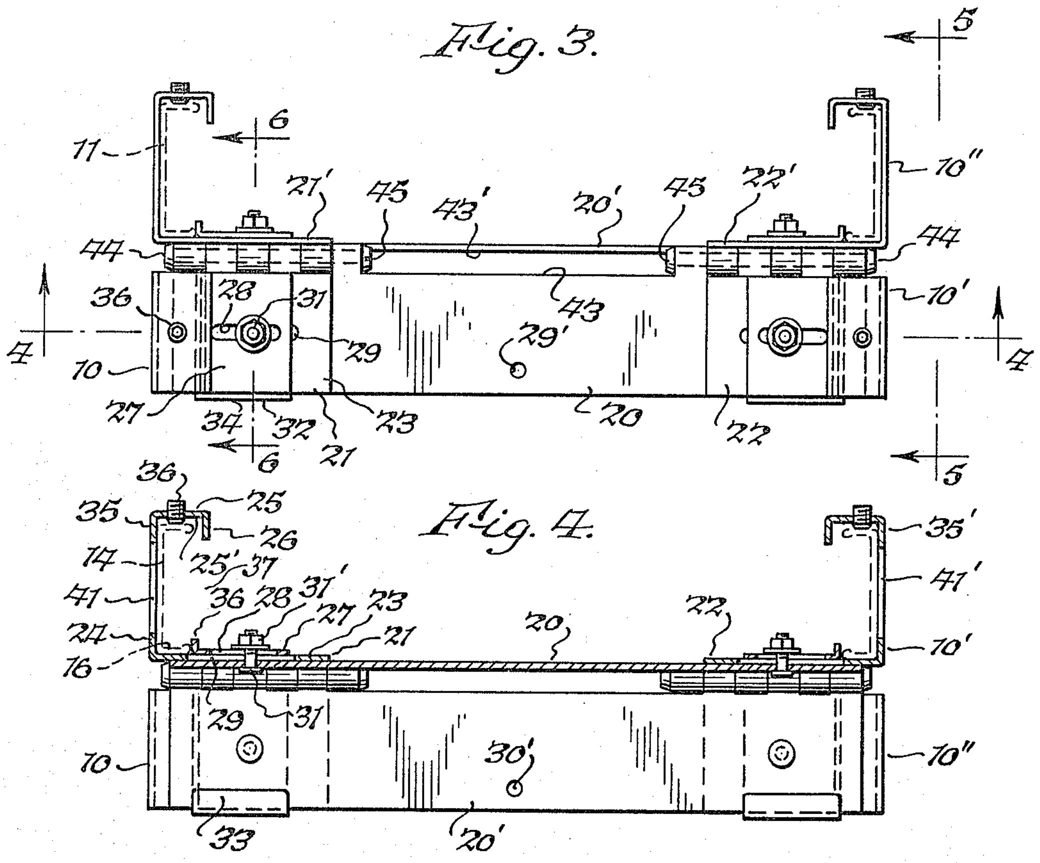
FIGURE 3 is a front elevational view of a ladder bracket with the sections thereof being oriented 90 degrees to each other.
FIGURE 4 is a view taken substantially along line 4—4 of FIGURE 3 and showing in greater detail the adjusting structure of the bracket.

While not shown in FIGURES 9 and 10, it will be appreciated that set screws, such as 36 of FIGURE 4, may be used for the purpose of effectively adjusting the distance between plate 120 and plate 108 or an insert may be placed in abutting relationship on the inside surface of plate 107 and suitably held there to accommodate narrower side rails. After the bracket portion has been moved to its adjusted position on a ladder section, elongated pin 127 is inserted through aligned apertures 128 in plates 119 and this pin also extends through the hollow rung of an aluminum ladder. Thereafter, turnbuckles, such as 47 (not shown in FIGURES 9 and 10) may be mounted over the ends of pins 127 and nuts 129 may be installed to prevent the turnbuckle from falling off. Essentially therefore it can be seen that up to this point the embodiment of FIGURES 9 and 10 is broadly similar to that described with respect to the remainder of the figures.

However, the embodiment of FIGURE 9 may also be used for wooden ladders in the following manner: More specifically, plate 115 may be eliminated and a rivet may be substituted for nut 111, said rivet permitting the above mentioned sliding movement of plate 108 on plate 101. The spacing between side plates 109 may be adjusted by the use of the turnbuckle 124 and the opposed rail bracketing portions, such as 106 and 107, may be slipped over the rails of a ladder and moved to a desired location. Thereafter turnbuckle 124 may be manipulated to cause side plates 119 to move toward each other to thereby firmly engage the outer sides of the side rails of the ladder. This firm gripping engagement should provide enough strength for most applications. However, if desired the inner surfaces of plates 119 may be roughened up to provide better frictional engagement and in fact, may have small prongs extending inwardly therefrom to bite into the ladder sides. Alternatively, a plate insert may be mounted on the insides of plates 119, said plate inserts having small prongs which extend inwardly for biting into the wooden sides of a ladder and being removable when the bracket is used on aluminum ladders. Furthermore, set screws, such as 36 may also be used to lock the ladder bracket 100 in position on the wooden side rails. It will be appreciated, of course, that pins 127 are not used with wooden ladder constructions.

It can thus be seen that the various embodiments of the present invention are manifestly capable of achieving the above enumerated objects and while preferred embodiments of the present invention have been described, it will readily be appreciated that it is not limited thereto but may be otherwise embodied within the scope of the following claims.

We claim:

1. A ladder bracket for mounting on the side rails of a ladder comprising first and second bracket sections each having first and second sleeve-like members, means for spacing said first and second sleeve-like members from each other, first opening means in said first and second sleeve-like members for receiving the side rails of a ladder, second opening means in said first and second sleeve-like members for permitting said sleeve-like members to slide past the rungs of a ladder, and means on said first and second sleeve-like members for mounting pin means adapted to extend toward said second opening means.

2. A ladder bracket as set forth in claim 1 including means for joining said first and second bracket sections to each other for relative movement.

3. A ladder bracket as set forth in claim 1 wherein said means for mounting said pin means comprise third opening means.

4. A ladder bracket as set forth in claim 1 including means for moving said first and second sleeve-like members toward and away from each other.

5. A ladder bracket as set forth in claim 4 including means for effectively adjusting the size of said first and second sleeve-like members.

6. A ladder bracket for mounting on side rails of a ladder comprising a first bracket section including a first elongated plate having first sleeve-like members spacedly mounted thereon, a second elongated plate having second sleeve-like members spacedly mounted thereon, hinge means coupling said first and second plate members for pivotal movement relative to each other, first opening means in said first and second sleeve-like members for receiving the side rails of a ladder, second opening means in said first and second sleeve-like members for permitting said first and second sleeve-like members to slide past the rungs of a ladder, third opening means in said first and second sleeve-like members in opposition to said second openings, first means for mounting said first sleeve-like members on said first plate for relative movement toward and away from each other, second means for mounting said second sleeve-like members on said second plate for movement toward and away from each other, and pin means for extending through said second and third openings in said first and second sleeve-like members.

7. A ladder bracket as set forth in claim 6 wherein said pin means comprise first pin means for extending through said second and third openings in said first sleeve-like members and second pin means for extending through said second and third openings in said second sleeve-like members, and means for fastening said first and second pin means to each other.

8. A ladder bracket as set forth in claim 6 including means for effectively varying the size of said first and second sleeve-like members.

9. A ladder bracket as set forth in claim 6 wherein said third opening means are elongated in a direction substantially perpendicular to said plates.

10. A ladder bracket comprising first and second bracket sections, said first bracket section including first side rail bracketing means spaced from each other, each of said first side rail bracketing means including first open portions to permit sliding movement of said first bracketing means on the side rails of a ladder without being impeded by the rungs thereof, said second bracket section including second side rail bracketing means spaced from each other, each of said second side rail bracketing means including second open portions to permit sliding movement of said second bracketing means on the side rails of a ladder without being impeded by the rungs thereof, said first side rail bracketing means including means for mounting first pin means, said second side rail bracketing means including means for mounting second pin means, and means for joining said first and second bracket sections to each other.

11. A ladder bracket as set forth in claim 10 wherein said means for mounting said first and second pin means comprise first aperture means in said first rail bracketing means and second aperture means in said second rail bracketing means.

12. A ladder bracket as set forth in claim 11 including first pin means for extending through said first aperture means and second pin means for extending through said second aperture means.

13. A ladder bracket as set forth in claim 12 including means for fastening said first pin means to said second pin means while said first pin means extends through said first aperture means and said second pin means extends through said second aperture means.

14. A ladder-scaffold construction comprising first, second and third ladder sections each having side rails and hollow rungs extending between said side rails; first, second, and third ladder brackets for coupling said first and second, second and third, and third and first ladder sections, respectively, to thereby cause said first ladder section to function as a ladder and said second ladder section to function as a base for supporting planking and said third ladder section to function as a brace extending between said first ladder section and said third ladder section; each of said first, second and third ladder brackets comprising a pair of bracket sections each having a body member, first and second side rail bracketing means spacedly mounted on certain of said body members, each of said first and second side rail bracketing means having a portion for receiving the side rails of a ladder section, an open portion in each of said side rail bracketing means for receiving a rung to thereby permit each of said first and second side rail bracketing means to have sliding engagement onto the side rails of said ladder sections, and means for effectively coupling said body members to each other.

15. A ladder-scaffold construction as set forth in claim 14 wherein said first rail bracketing means includes a first plate member, said second rail bracketing means includes a second plate member substantially parallel to said first plate member, said first and second plate members being oriented to extend substantially perpendicularly to a rung when mounted on said side rails, first aperture means in said first plate member, second aperture means in said second plate member, and pin means for extending through said first and second aperture means and a hollow aligned rung therebetween.

16. A ladder-scaffold construction as set forth in claim 15 wherein said means for effectively coupling said body members to each other comprise means for securing said pin means to each other against movement.

17. In combination: a ladder having spaced side rails and a hollow rung therebetween; and a ladder bracket section comprising a body member, spaced bracketing means on said body member for extending outwardly of said side rails to thereby cause said side rails to lie inwardly of said spaced bracketing means, and means on said bracketing means for supporting pin means extending from said bracketing means into said hollow rung.

18. The combination set forth in claim 17 wherein said means on said bracketing means comprise apertures therein.

19. The combination as set forth in claim 18 including pin means extending between said bracketing means and said hollow rung.

20. In combination: a first ladder section having first spaced side rails and a first hollow rung therebetween; a second ladder section having second spaced side rails and a second hollow rung therebetween; and a ladder bracket having first and second bracket sections, said first bracket section having first spaced side rail bracketing means for extending outwardly of said first side rails, said second bracket section having second spaced side rail bracketing means for extending outwardly of said second side rails, first means on said first bracketing means adapted to support pin means extending from said bracketing means into said first hollow rung, and second means on said second bracketing means for supporting pin means adapted to extend from said second bracketing means into said second hollow rung.

21. The combination set forth in claim 20 wherein said first and second means comprise first and second apertures.

22. The combination as set forth in claim 21 including first pin means extending between said first rail bracketing means and said first hollow rung and second pin means extending between said second bracketing means and said second hollow rung.

23. The combination set forth in claim 22 including means for attaching said first and second pin means to each other, and means for permitting relative movement between said first and second bracket sections.

24. A ladder bracket construction for mounting on the side rails of a ladder having a hollow rung therebetween comprising side rail bracketing means for lying outside of said side rails, pin means for extending from said side rail bracketing means into said hollow rung for attaching said side rail bracketing means and said hollow rung, elongated rod means mounted on said ladder bracket and having end portions extending beyond said side rails, and leg means extending from oppisite ends of said rod means for carrying the weight of a portion of said ladder to points outside of said side rails.

References Cited by the Examiner

UNITED STATES PATENTS

| | | | |
|---|---|---|---|
| 2,327,317 | 8/1943 | Randall | 182—107 |
| 2,647,676 | 8/1953 | Napiecinski | 182—25 |

FOREIGN PATENTS

| | | |
|---|---|---|
| 930,123 | 6/1963 | Great Britain. |

REINALDO P. MACHADO, *Primary Examiner.*